United States Patent
Teo et al.

(10) Patent No.: US 10,693,714 B2
(45) Date of Patent: Jun. 23, 2020

(54) COMMUNICATION METHOD FOR WI-FI INTERNET OF THINGS EQUIPMENT AND WI-FI INTERNET OF THINGS SYSTEM

(71) Applicant: ESPRESSIF SYSTEMS (SHANGHAI) PTE LTD, Shanghai (CN)

(72) Inventors: Swee Ann Teo, Shanghai (CN); Hao Lin, Shanghai (CN); Jiangjian Jiang, Shanghai (CN); Rui Zhan, Shanghai (CN)

(73) Assignee: ESPRESSIF SYSTEMS (SHANGHAI) PTE LTD, Shanghai (CN)

( * ) Notice: Subject to any disclaimer, the term of this patent is extended or adjusted under 35 U.S.C. 154(b) by 0 days.

(21) Appl. No.: 15/576,934

(22) PCT Filed: Jul. 20, 2015

(86) PCT No.: PCT/CN2015/084443
§ 371 (c)(1),
(2) Date: Nov. 27, 2017

(87) PCT Pub. No.: WO2016/192183
PCT Pub. Date: Dec. 8, 2016

(65) Prior Publication Data
US 2018/0159728 A1    Jun. 7, 2018

(30) Foreign Application Priority Data

May 29, 2015    (CN) .......................... 2015 1 0285856
May 29, 2015    (CN) ..................... 2015 2 0360037 U

(51) Int. Cl.
*H04L 12/24*    (2006.01)
*H04L 29/08*    (2006.01)
(Continued)

(52) U.S. Cl.
CPC ............ *H04L 41/0803* (2013.01); *H04L 9/12* (2013.01); *H04L 63/0428* (2013.01);
(Continued)

(58) Field of Classification Search
CPC ............. H04L 2209/80; H04L 41/0803; H04L 63/0428; H04L 63/168; H04L 67/10;
(Continued)

(56) References Cited

U.S. PATENT DOCUMENTS 4,737,609 A    4/1988    Yuhasz et al.
7,962,775 B1    6/2011    Vaidyu et al.
(Continued)

FOREIGN PATENT DOCUMENTS

CN    101344985 A    1/2009
CN    102157054 A    8/2011
(Continued)

OTHER PUBLICATIONS

International Search Report dated Jan. 12, 2016 in corresponding PCT International Application No. PCT/CN2015/084443.
(Continued)

*Primary Examiner* — Kan Yuen
(74) *Attorney, Agent, or Firm* — Amster, Rothstein & Ebenstein LLP

(57) ABSTRACT

A communication method for Wi-Fi Internet of Things equipment, which is used for Wi-Fi Internet of Things main control equipment to send control information to Wi-Fi Internet of Things controlled equipment, in which Wi-Fi Internet of main control equipment and Wi-Fi Internet of Things controlled equipment complete pairing, and acquire a MAC address and a communication key of each other; the Wi-Fi Internet of main control equipment sends control information to the Wi-Fi Internet of Things controlled equipment by loading a private information structure in a Wi-Fi
(Continued)

---

301 — perform pairing of the Wi-Fi IoT master control device with the Wi-Fi IoT controlled devices to obtain MAC addresses and encryption keys of each other 302 — transmit, by the Wi-Fi IoT master control device, the control information to the Wi-Fi IoT controlled devices by loading a private information structure into a Wi-Fi unicast packet or multicast packet 303 — transmit, by the Wi-Fi IoT controlled devices after receiving the control information, confirmation information to the Wi-Fi IoT master control device unicast packet or multicast packet; and the Wi-Fi Internet of Things controlled equipment sends confirmation information to the Wi-Fi Internet of Things main control equipment after receiving the control information.

14 Claims, 2 Drawing Sheets

(51) Int. Cl.
| | | |
|---|---|---|
| H04W 4/70 | (2018.01) | |
| H04L 9/12 | (2006.01) | |
| H04W 52/02 | (2009.01) | |
| H04L 29/06 | (2006.01) | |
| H04W 12/02 | (2009.01) | |
| H04W 76/10 | (2018.01) | |
| H04W 84/12 | (2009.01) | |

(52) U.S. Cl.
CPC ............ *H04L 63/168* (2013.01); *H04L 67/10* (2013.01); *H04L 67/12* (2013.01); *H04L 67/125* (2013.01); *H04W 4/70* (2018.02); *H04W 12/02* (2013.01); *H04W 52/0212* (2013.01); *H04L 2209/80* (2013.01); *H04L 2209/805* (2013.01); *H04W 76/10* (2018.02); *H04W 84/12* (2013.01); *Y02D 70/10* (2018.01); *Y02D 70/14* (2018.01); *Y02D 70/142* (2018.01)

(58) Field of Classification Search
CPC ...... H04L 67/12; H04L 67/125; H04W 12/02; H04W 4/00; H04W 4/70; H04W 52/02; H04W 76/10; H04W 84/12; Y02D 70/10
See application file for complete search history.

(56) References Cited

U.S. PATENT DOCUMENTS

| | | | |
|---|---|---|---|
| 2004/0233855 A1 | 11/2004 | Gutierrez et al. | |
| 2005/0141498 A1 | 6/2005 | Winget et al. | 370/389 |
| 2009/0070857 A1* | 3/2009 | Azuma | G06F 21/33 |
| | | | 726/3 |
| 2011/0249571 A1 | 10/2011 | Das et al. | |
| 2013/0332627 A1 | 12/2013 | Skog et al. | |
| 2015/0312705 A1* | 10/2015 | Pan | H04W 4/60 |
| | | | 455/41.2 |
| 2016/0294828 A1* | 10/2016 | Zakaria | H04W 4/70 |

FOREIGN PATENT DOCUMENTS

| | | | |
|---|---|---|---|
| CN | 102484751 | A | 5/2012 |
| CN | 202615143 | U | 12/2012 |
| CN | 102860133 | A | 1/2013 |
| CN | 202773156 | U | 3/2013 |
| CN | 103329629 | A | 9/2013 |
| CN | 103546909 | A | 1/2014 |
| CN | 103763164 | A | 4/2014 |
| CN | 103841658 | A | 6/2014 |
| CN | 103957580 | A | 7/2014 |
| CN | 103997829 | A | 8/2014 |
| CN | 104133408 | A | 11/2014 |
| CN | 104202308 | A | 12/2014 |
| CN | 104206001 | A | 12/2014 |
| CN | 104618900 | A | 5/2015 |
| CN | 104955241 | B | 9/2015 |
| CN | 104968037 | A | 10/2015 |
| CN | 204721613 | U | 10/2015 |
| CN | 105101456 | A | 11/2015 |
| CN | 204836236 | U | 12/2015 |
| CN | 105981352 | A | 9/2016 |
| CN | 104955241 | B | 5/2018 |
| JP | 2003109778 | A | 4/2003 |

OTHER PUBLICATIONS

Written Opinion dated Jan. 12, 2016 in corresponding PCT International Application No. PCT/CN2015/084443.
U.S. Office Action issued in corresponding U.S. Appl. No. 15/577,549, filed Nov. 28, 2017.
International Search Report and Written Opinion dated Mar. 18, 2016 issued in corresponding PCT Application No. PCT/CN2015/099426.
Chinese Office Action dated Mar. 13, 2018 issued in corresponding Chinese Application No. 201510285856.2.
Chinese Office Action dated Nov. 30, 2017 issued in corresponding Chinese Application No. 201510285856.2.
Chinese Office Action dated Jan. 17, 2017 issued in corresponding Chinese Application No. 2015110398333.9.

* cited by examiner

COMMUNICATION METHOD FOR WI-FI INTERNET OF THINGS EQUIPMENT AND WI-FI INTERNET OF THINGS SYSTEM

CROSS-REFERENCE TO RELATED APPLICATIONS

The present application is a 35 U.S.C. §§ 371 national phase conversion of PCT/CN2015/084443, filed Jul. 20, 2015, which claims priority to Chinese Patent Application Nos. 201510285856.2 and 201520360037.5, both filed May 29, 2015, the contents of all of which are incorporated herein by reference. The PCT International Application was published in the Chinese language.

FIELD

Embodiments of the present disclosure generally relate to the field of IoT technologies, and more particularly to a Wi-Fi IoT device communication method and a Wi-Fi IoT system.

BACKGROUND

IoT refers to the Internet of Things. IoT devices may be various kinds of information sensors and controllers or various kinds of smart home appliances. The IoT devices access the Internet in a variety of ways to form an immense network, thereby realizing extension of the Internet from people to things.

Among IoT access methods, a Wi-Fi IoT access method has the widest application, the lowest cost, and the best scalability. A Wi-Fi IoT device usually accesses a network directly via a Wi-Fi access point (also referred to as a Wi-Fi hotspot or a wireless router).

Currently, many home or commercial Wi-Fi IoT devices have emerged on the market. These IoT devices are mostly controlled via an application on a mobile terminal such as a mobile phone or a pad, which, however, is not so convenient sometimes. For example, prevalent Wi-Fi IoT lighting devices on the market usually use a mobile terminal application interface to control their on/off and tune their brightness/color tone, equipped with a traditional mechanical switch for simple control of on/off and brightness. As a consequence, control by the application interface is complex and inconvenient, while the traditional mechanical switch is inflexible to control and difficult to lay out wires. In most situations, a wiring-free position-flexible field control of a lighting device is more attractive to users than a remote control by a mobile terminal (controlled by a mobile phone application).

In response to the above needs on wireless lighting control, some wiring-free wirelessly remotely controlled lighting switch devices have been available on the market. These wiring-free wirelessly remotely controlled lighting switch devices perform a simple on/off control to a lighting device using a private communication method at a non-standard frequency band (e.g., 1 GHz, 315 MHz, etc.) in a non-standard mode, but do not support a control by a mobile phone application. Moreover, because such devices work on a non-public frequency band, mutual interference with signals from other systems likely occur, affecting user experience.

It is provided in the Wi-Fi Standard Protocol that manufacturers and suppliers may define a vendor specific information element according to application needs. Different types of control information may be defined based on different types of control interfaces (capacitive touch keys, touch screens, etc.) of wiring-free Wi-Fi IoT lighting switches, thereby enabling control of a Wi-Fi IoT lighting device, either in a simple fashion or in a fine and complex fashion.

If a manufacturer does not follow the Wi-Fi Standard Protocol, it may restructure a packet payload or modify an MAC-layer protocol stack to thereby load control information.

The above two loading approaches are uniformly referred to as a private information structure.

A Wi-Fi IoT device is generally controlled based on a Wi-Fi connection. For a Wi-Fi IoT device such as the wiring-free Wi-Fi IoT lighting switch which has a rather long control information generation period, if a connection control communication mode is adopted, the Wi-Fi connection with the Wi-Fi IoT lighting device has to be re-established almost for each time of control, which will consume most of energy on control frames. For a wiring-free IoT lighting switch that is primarily powered by a battery, a Wi-Fi connection-based control mode will significantly reduce battery life.

SUMMARY

An objective of the present disclosure is to provide a Wi-Fi IoT device communication method and a Wi-Fi IoT system; with unicast packet or multicast packet communication in an MAC layer non-connection mode, the Wi-Fi IoT device may implement transmission of control information by transmitting a minimum number of packets, which achieves a lowest power consumption, thereby prolonging a battery change or recharge period to a maximum extent.

To achieve the objective above, the present disclosure is implemented through a technical solution below: a Wi-Fi IoT device communication method for a Wi-Fi IoT master control device to transmit control information to Wi-Fi IoT controlled devices, the method comprising steps of:

performing pairing of the Wi-Fi IoT master control device with the Wi-Fi IoT controlled devices to obtain MAC addresses and encryption keys of each other;

transmitting, by the Wi-Fi IoT master control device, the control information to the Wi-Fi IoT controlled devices by loading a private information structure into a Wi-Fi unicast packet or multicast packet.

Further, the communication method further comprises: transmitting, by the Wi-Fi IoT controlled devices after receiving the control information, confirmation information to the Wi-Fi IoT master control device.

Further, the step of transmitting, by the Wi-Fi IoT controlled devices after receiving the control information, confirmation information to the Wi-Fi IoT master control device further comprises:

transmitting, by the Wi-Fi IoT controlled devices, the confirmation information to the Wi-Fi IoT master control device by loading a private information structure defined for confirmation into the unicast packet or multicast packet;

or, transmitting, by the Wi-Fi IoT controlled devices, the confirmation information to the Wi-Fi IoT master control device in a manner of replying with an ACK data packet.

Further, when the Wi-Fi IoT master control device transmits the control information to the Wi-Fi IoT controlled devices, the communication method further comprises:

encrypting the control information in a preset encryption manner.

Further, the preset encryption manner includes:

application layer encryption, which means encrypting the private information structure with an encryption key at the application layer with an encryption key; and MAC layer encryption, which means encrypting the unicast packet or multicast packet at an MAC layer with an encryption key.

Further, the unicast packet or multicast packet refers to a unicast packet or multicast packet that does not need an MAC link.

Further, the unicast packet or multicast packet refers to a management packet that does not need an MAC link, i.e., a Beacon packet, a ProbResp packet, a ProbReq packet, or an Action packet.

Further, the unicast packet or multicast packet is an MAC link management packet or a data packet.

The present disclosure may also be implemented through a technical solution below: a Wi-Fi IoT system, comprising:

a Wi-Fi IoT master control device;

a plurality of Wi-Fi IoT controlled devices, the Wi-Fi IoT master control device transmitting control information to the Wi-Fi IoT controlled devices by loading a private information structure into a Wi-Fi unicast packet or multicast packet in an MAC layer non-connection mode; wherein:

the Wi-Fi IoT master control device comprises:

a first matching unit configured to perform pairing with the Wi-Fi IoT controlled devices;

a first acquiring unit connected with the first matching unit, configured to acquire MAC addresses of the Wi-Fi IoT controlled devices when the Wi-Fi IoT master control device and the Wi-Fi IoT controlled devices are successfully paired;

a first storing unit connected with the first acquiring unit, configured to store encryption keys between the Wi-Fi IoT master control device and the Wi-Fi IoT controlled devices, MAC addresses of the Wi-Fi IoT controlled devices, and preset types of the unicast packet or multicast packet;

a selecting unit connected with the first storing unit, configured to select a type of the unicast packet or multicast packet; and a transmission unit connected with the selecting unit, configured to transmit control information to the Wi-Fi IoT controlled devices.

Further, the Wi-Fi IoT master control device further comprises an encrypting unit connected with the transmission unit, configured to encrypt the control information in a preset encryption manner.

Further, the encrypting unit further comprises:

an application layer encrypting sub-unit, configured to encrypt the private information structure at application layer with an encryption key; and a MAC layer encrypting sub-unit, configured to encrypt the unicast packet or multicast packet at an MAC layer with an encryption key.

Further, the Wi-Fi IoT controlled device comprises:

a second matching unit configured to perform pairing with the first matching unit of the Wi-Fi IoT master control device;

a second acquiring unit connected with the second matching unit, configured to acquire the MAC address of the Wi-Fi IoT master control device when the Wi-Fi IoT master control device is successfully paired with the Wi-Fi IoT controlled device;

a second storing unit connected with the second acquiring unit, configured to store an encryption key between the Wi-Fi IoT master control device and the Wi-Fi IoT controlled device, the MAC address of the Wi-Fi IoT master control device, and the control information;

a receiving unit connected with the second storing unit, configured to receive the control information transmitted by the transmission unit of the Wi-Fi IoT master control device;

a confirming unit connected with the receiving unit, configured to transmit confirmation information to the Wi-Fi IoT master control device after the Wi-Fi IoT controlled device receives the control information; and a decrypting unit connected with the receiving unit, configured to decrypt encrypted control information transmitted by the Wi-Fi IoT master control device.

Further, the confirming unit further comprises:

a private information structure confirmation sub-unit, configured to transmit the confirmation information to the Wi-Fi IoT master control device by loading a private information structure defined for confirmation into the unicast packet or multicast packet; or an ACK confirmation sub-unit configured to transmit the confirmation information to the Wi-Fi IoT master control device in a manner of replying with an ACK data packet.

Further, the unicast packet or multicast packet is a unicast packet or multicast packet that does not need an MAC link.

Further, the unicast packet or multicast packet is a Beacon packet, a ProbResp packet, a ProbReq packet, or an Action packet.

Further, the unicast packet or multicast packet is an MAC link management packet or a data packet.

Compared with the prior art, the Wi-Fi IoT device communication method and the Wi-Fi IoT system according to the present disclosure have the following advantages: with unicast packet or multicast packet communication in an MAC layer non-connection mode, the Wi-Fi IoT device may implement transmission of control information by transmitting a minimum number of packets, which achieves a lowest power consumption, thereby prolonging a battery change or recharge period to a maximum extent; the present disclosure may be implemented by only slightly modifying a software part of the MAC layer on a standard Wi-Fi IoT device, or may even be implemented at an application layer, such that the implementation cost is low and the implementation method is simple; when the present disclosure is implemented on an existing Wi-Fi chip, the circuit of the standard Wi-Fi IoT device will not be changed, such that the standard Wi-Fi IoT device may be connected to the AP and access the Internet in a normal STA mode, thereby maintaining the functions of the original mobile terminal application control and remote control.

DETAILED DESCRIPTION OF EMBODIMENTS

Hereinafter, the present disclosure will be further expounded by illustrating a preferred embodiment in details.

A Wi-Fi IoT system comprises: a Wi-Fi IoT master control device 100; a plurality of Wi-Fi IoT controlled devices 200; the Wi-Fi IoT master control device 100 transmits control information to the Wi-Fi IoT controlled devices 200 by loading a private information structure into a Wi-Fi unicast packet or multicast packet in an MAC layer non-connection mode.

Figure 1:
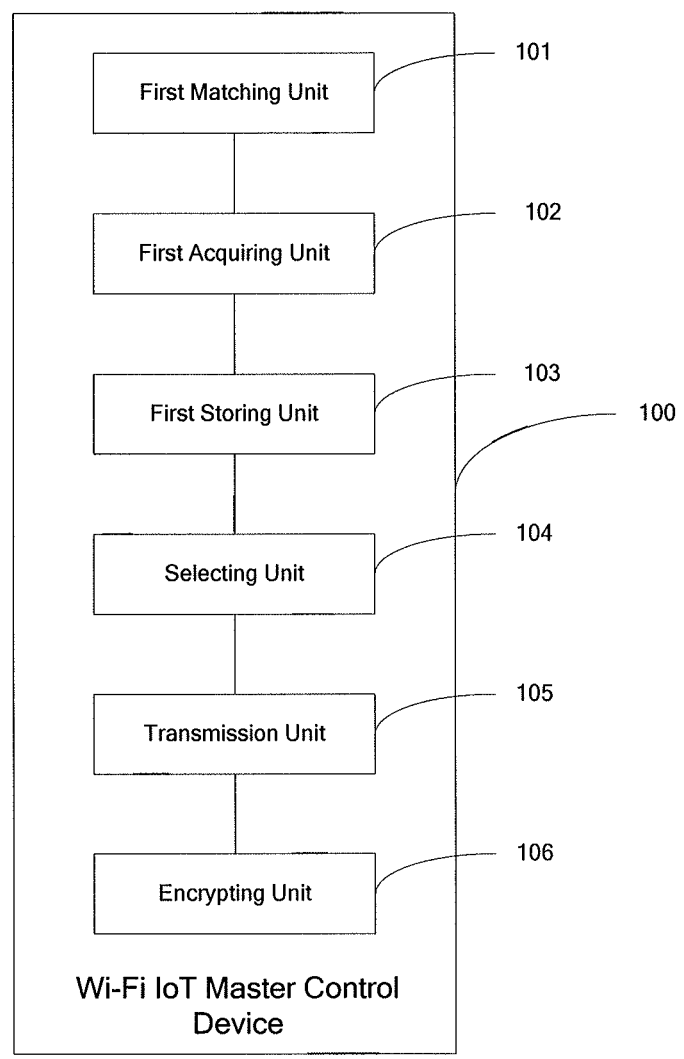
FIG. 1 is a structural block diagram of a Wi-Fi IoT master control device.

As illustrated in FIG. 1, the Wi-Fi IoT master control device 100 comprises: a first matching unit 101 configured to perform pairing with the Wi-Fi IoT controlled devices 200; a first acquiring unit 102 connected with the first matching unit 101, configured to acquire MAC addresses of the Wi-Fi IoT controlled device 200 when the Wi-Fi IoT master control device 100 is successfully paired with the Wi-Fi IoT controlled devices 200; a first storing unit 103 connected with the first acquiring unit 102, configured to store encryption keys between the Wi-Fi IoT master control device 100 and the Wi-Fi IoT controlled devices 200, MAC addresses of the Wi-Fi IoT controlled devices 200, and preset types of unicast packet or multicast packet; a transmission unit 105 connected with the selecting unit 104, configured to transmit the control information to the Wi-Fi IoT controlled devices 200; and an encrypting unit 106 connected with the transmitting unit 105, configured to encrypt the control information in a preset encryption manner.

Figure 2:
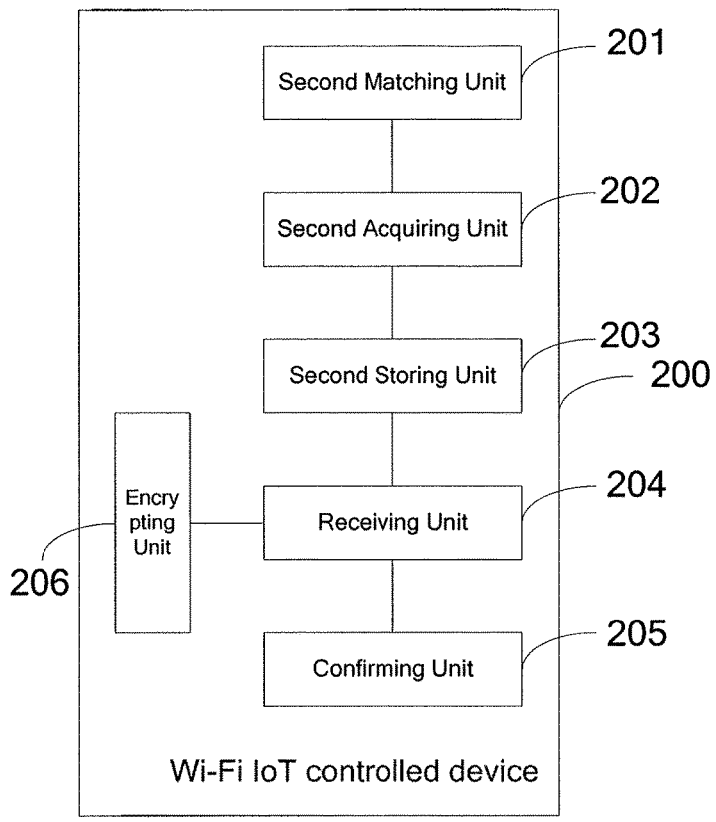
FIG. 2 is a structural block diagram of a Wi-Fi IoT controlled device.

As illustrated in FIG. 2, the Wi-Fi IoT controlled device 200 comprises: a second matching unit 201 configured to perform pairing with the first matching unit 101 of the Wi-Fi IoT master control device 100; a second acquiring unit 202 connected with the second matching unit 201, configured to acquire an MAC address of the Wi-Fi IoT master control device 100 when the Wi-Fi IoT master control device 100 is successfully paired with the Wi-Fi IoT controlled device 200; a second storing unit 203 connected with the second acquiring unit 202, configured to store an encryption key between the Wi-Fi IoT master control device 100 and the Wi-Fi IoT controlled device 200, an MAC address of the Wi-Fi IoT master control device 100, and control information; a receiving unit 204 connected with the second storing unit 203, configured to receive control information transmitted by the transmission unit 105 of the Wi-Fi IoT master control device 100; a confirming unit 205 connected with the receiving unit 204, configured to transmit confirmation information to the Wi-Fi IoT master control device 100 after the Wi-Fi IoT controlled device 200 receives the control information; and a decrypting unit 206 connected with the receiving unit 204, configured to decrypt the encrypted control information transmitted by the Wi-Fi IoT master control device 100.

Figure 3:
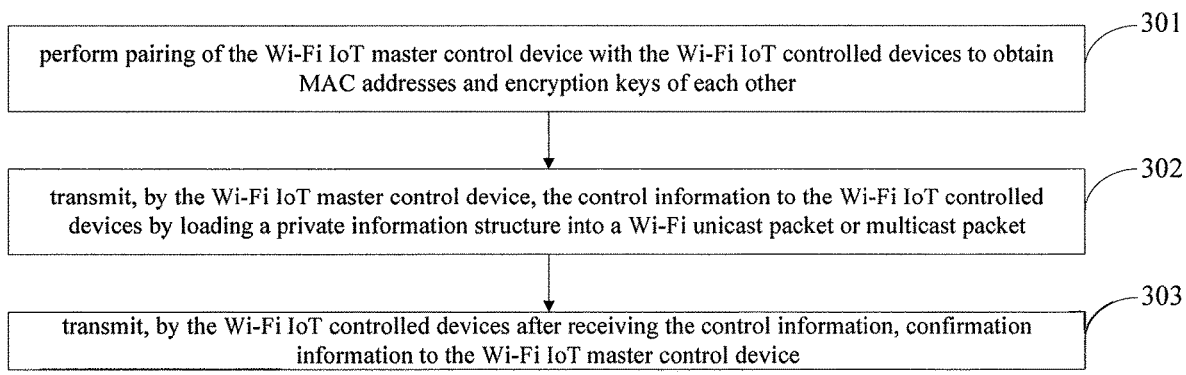
FIG. 3 is a flow diagram of a Wi-Fi IoT device communication method.

As illustrated in FIG. 3, a Wi-Fi IoT device communication method for a Wi-Fi IoT master control device to transmit control information to Wi-Fi IoT controlled devices, the method comprising steps of:

Step 301: performing pairing of the Wi-Fi IoT master control device with the Wi-Fi IoT controlled devices (the pairing may be completed at the factory or by a user) to obtain MAC addresses and encryption keys of each other;

Step 302: transmitting, by the Wi-Fi IoT master control device, the control information to the Wi-Fi IoT controlled devices by loading a private information structure into a Wi-Fi unicast packet or multicast packet; for the multicast packet, pairing information is provided in the private information structure; while the unicast packet may distinguish the paired devices in a header address, and pairing information may also be put into a private information structure; and Step 303: transmitting, by the Wi-Fi IoT controlled devices after receiving the control information, confirmation information to the Wi-Fi IoT master control device.

The step 302 further comprises: encrypting the control information in a preset encryption manner. The preset encryption manner comprises: application layer encryption, which means encrypting the private information structure at an application layer with an encryption key; and MAC layer encryption, which means encrypting the unicast packet or multicast packet at an MAC layer with an encryption key. Of course, it may also be selected not to encrypt, but to transmit in a plain text over a wireless channel.

In step 303, the Wi-Fi IoT controlled devices confirm the received packet in the following three manners according to different types of packets loaded with the private information structure and the requirements of application scenarios: 1) a private information structure for confirmation may be defined in the application layer or MAC layer software and loaded onto a Wi-Fi unicast packet or multicast packet type, for a top-layer confirmation by the Wi-Fi IoT controlled devices with respect to the received control information; 2) no need of top-layer confirmation; for some types of packets, the Wi-Fi standard specifies that the MAC hardware automatically replies with an ACK packet; 3) for some packet types, no confirmation is adopted, and the Wi-Fi standard specifies that the MAC hardware does not automatically reply with the ACK packet.

As a specific case of a multicast packet, a broadcast packet is also included in the scope of the present disclosure. When the unicast packet or the multicast packet is a kind of MAC link management packet or data packet, if the management packet or data packet that needs an MAC link is reformed, the reformed management packet or data packet may also be applied in the non-MAC layer connection control transmission mechanism in the present disclosure. A management packet or data packet that needs an MAC link refers to a Wi-Fi MAC management packet during a Wi-Fi connection process or a Wi-Fi MAC management packet and Wi-Fi MAC data packet after the Wi-Fi connection is established.

With the management packet as a unicast packet or multicast packet, the following manners may be used to load the control information: a) vendor specific information elements; b) reforming a payload content of the management packet, and correspondingly modifying an MAC software protocol stack. The two kinds of loading manners are uniformly referred to as a private information structure.

If the MAC non-connection control transmission is performed using the MAC link data packet, it is needed to reform the data packet payload content, and the MAC software protocol stack also needs to be modified.

Preferably, the unicast packet or multicast packet is a management packet that does not need an MAC link: a Beacon packet, a ProbResp packet, a ProbReq packet, or an Action packet.

A preferred control information loading manner is loading the vendor specific information element into the management packet.

The Wi-Fi IoT controlled device is a standard Wi-Fi IoT device, for example, an electric appliance having a Wi-Fi function, such as a Wi-Fi IoT lighting device, a smart TV, and a smart air-conditioner, etc.

A preferred control information loading manner is a vendor specific information element.

The packet types, confirmation modes, and encryption modes may be combined freely in use according to specific situations.

In a preferred embodiment of the present disclosure, the Wi-Fi IoT controlled device is a standard Wi-Fi IoT device, i.e., supporting a standard Wi-Fi function, capable of being normally connected to the AP, and connected to an extranet the internet via the AP. Preferably, the Wi-Fi IoT controlled device is an electric appliance having a Wi-Fi function, e.g., a Wi-Fi IoT lighting device. The packet type and control information loading mode adopt preferred solutions.

Embodiment: the Wi-Fi IoT master control device of the present disclosure is a Wi-Fi switch, while the Wi-Fi IoT controlled device is a Wi-Fi lamp. The Wi-Fi switch and the Wi-Fi lamp have been paired at the factory, wherein the Wi-Fi switch has a single-point capacitive touch key interface, which may implement a simple on/off function.

When the capacitive touch key on the Wi-Fi switch senses a user's touch behavior and it is needed to change a state of the Wi-Fi lamp, the possible several unicast packet and multicast packet types and a packet exchanging embodiment of the MAC layer non-connection communication control mechanism are provided below, but not limited to the following packet types and parameter settings.

If the Wi-Fi lamp only supports a standard Wi-Fi STA mode and is already connected to the AP, then in this mode, the Wi-Fi switch may transmit a multicast Beacon packet or a unicast/multicast ProbResp packet for MAC non-connection communication.

Specifically, the Wi-Fi switch transmits a plurality (e.g., 10) of multicast Beacon packets carrying vendor specific information elements to paired Wi-Fi lamps within a time window (e.g., 100 ms); it is unnecessary for the paired Wi-Fi lamps to return a confirmation, and the MAC hardware does not transmit an ACK packet confirmation responsive to the multicast Beacon packet either. In the case of control failure, the user may determine in bare eyes and re-touch the capacitive touch key. In this case, the information in the Beacon obtained by the Wi-Fi lamp is transmitted to the application layer, and the control process is only implemented at the application layer, without a need of modifying the software of MAC layer or the software and hardware of the layers therebelow; therefore, the implementation is the simplest.

The Wi-Fi switch transmits a unicast ProbResp packet carrying a vendor specific information element to a paired Wi-Fi lamp, waiting for the paired Wi-Fi lamp to return an MAC hardware ACK packet. In the case of confirmation overtime, the unicast ProbResp packet will be retransmitted till the ACK packet is successfully received, or interrupted by other action of the user. In this case, the Wi-Fi lamp needs to change its MAC software and application layer.

If the Wi-Fi lamp supports both the standard Wi-Fi STA mode and the soft AP mode and is already connected to the AP in a standard Wi-Fi STA mode, the Wi-Fi switch may also transmit a multicast/unicast ProbReq or multicast/unicast Action packet loaded with the vendor specific information element using the soft AP mode of the Wi-Fi lamp.

Specifically, the Wi-Fi switch transmits a plurality (e.g., 10) of multicast ProbReq/Action packets carrying the vendor specific information element to the paired Wi-Fi lamps within a time window (e.g., 100 ms). After receiving the multicast ProbReq/Action packets, the Wi-Fi lamps may adopt a mode of not replying with a confirmation packet; at this point, the MAC hardware does not reply with the ACK packet either; a mode of replying with a corresponding ProbResp/Action packet loaded with a confirmed IE (information element) may also be adopted.

After the Wi-Fi lamps receive the unicast ProbReq/Action packets mentioned above, the MAC hardware replies with an ACK packet according to a standard Wi-Fi behavior; further confirmation may be made using a corresponding ProbResp/Action packet loaded with confirmed control information.

If the Wi-Fi switch has other control interfaces (e.g., a touch screen), a more complex control of the lighting device behaviors may be implemented through a plurality of vendor specific private information elements. These vendor specific information elements may also implement control of the Wi-Fi lamps through the communication mechanism above.

Although the content of the present disclosure has been detailed above through the preferred embodiments, it should be appreciated that the above description should not be regarded as a limitation to the present disclosure. After those skilled in the art have read the contents above, various modifications and substitutions to the present disclosure will be obvious. Therefore, the protection scope of the present disclosure should be limited by the appended claims.

We claim:

1. A Wi-Fi Internet of Things device communication method for a Wi-Fi Internet of Things master control device to transmit control information to Wi-Fi Internet of Things controlled devices, the method comprising steps of:
   performing pairing of the Wi-Fi Internet of Things master control device with the Wi-Fi Internet of Things controlled devices to obtain media access control addresses and encryption keys of each other;
   encrypting the control information in a preset encryption manner, wherein the preset encryption manner includes:
   application layer encryption, which includes encrypting the private information structure with an encryption key at an application layer; and
   media access control layer encryption, which includes encrypting the at least one of the Wi-Fi unicast packet and the multicast packet at a media access control layer with an encryption key; and
   transmitting, by the Wi-Fi Internet of Things master control device in a media access control layer non-connection mode without establishing a WiFi communication session, the encrypted control information to the Wi-Fi Internet of Things controlled devices, where the Wi-Fi Internet of Things master control device is paired with the Wi-Fi Internet of Things controlled devices, by loading a private information structure into at least one of a Wi-Fi unicast packet and a multicast packet.

2. The communication method according to claim 1, further comprising:
   transmitting, by the Wi-Fi Internet of Things controlled devices after receiving the control information, confirmation information to the Wi-Fi Internet of Things master control device.

3. The communication method according to claim 1, wherein the step of transmitting, by the Wi-Fi Internet of Things controlled devices after receiving the control information, confirmation information to the Wi-Fi Internet of Things master control device, further comprises:
   transmitting, by the Wi-Fi Internet of Things controlled devices, the confirmation information to the Wi-Fi Internet of Things master control device by loading a private information structure defined for confirmation into the unicast packet or multicast packet; or
   transmitting, by the Wi-Fi Internet of Things controlled devices, the confirmation information to the Wi-Fi Internet of Things master control device in a manner of replying with an ACK data packet.

4. The communication method according to claim 1, wherein the at least one of the WiFi unicast packet and the multicast packet refers to a unicast packet or multicast packet that does not need a media access control link.

5. The communication method according to claim 4, wherein the at least one of the WiFi unicast packet and the multicast packet is at least one of a Beacon packet, a ProbResp packet, a ProbReq packet, and an Action packet.

6. The communication method according to claim 4, wherein the at least one of the WiFi unicast packet and the multicast packet is at least one of a media access control link management packet and a data packet.

7. A Wi-Fi Internet of Things system, comprising:
a Wi-Fi Internet of Things master control device;
a plurality of Wi-Fi Internet of Things controlled devices, the Wi-Fi Internet of Things master control device transmitting control information to the Wi-Fi Internet of Things controlled devices by loading a private information structure into one of a Wi-Fi unicast packet and a multicast packet in a media access control layer non-connection mode without establishing a WiFi communication session; wherein:
the Wi-Fi Internet of Things master control device comprises:
at least one processor operatively connected to at least one memory, wherein the memory includes processor executable code, that when executed by the processor, causes the processor to perform steps of:
pairing with the Wi-Fi Internet of Things controlled devices;
acquiring media access control addresses of the Wi-Fi Internet of Things controlled devices when the Wi-Fi Internet of Things master control device and the Wi-Fi Internet of Things controlled devices are successfully paired;
storing encryption keys between the Wi-Fi Internet of Things master control device and the Wi-Fi Internet of Things controlled devices, media access control addresses of the Wi-Fi Internet of Things controlled devices, and preset types of the unicast packet or multicast packet;
electing a type of the unicast packet or multicast packet; and
transmitting the encrypted control information to the Wi-Fi Internet of Things controlled devices.

8. The Wi-Fi Internet of Things system according to claim 7, wherein the master control device processor of the Wi-Fi Internet of Things master control device further performs a step of encrypting the control information in a preset encryption manner.

9. The Wi-Fi Internet of Things system according to claim 8, wherein the encrypting step further comprises:
encrypting the private information structure at an application layer with an encryption key; and
encrypting the unicast packet or multicast packet at a media access control layer with an encryption key.

10. The Wi-Fi Internet of Things system according to claim 9, wherein the Wi-Fi Internet of Things controlled device comprises a device processor and at least one device memory operatively connected thereto, where the device memory includes processor executable code, that when executed by the device processor, causes the device processor to perform steps of:
pairing with the first pairing step of the Wi-Fi Internet of Things master control device;
acquiring the media access control address of the Wi-Fi Internet of Things master control device when the Wi-Fi Internet of Things master control device is successfully paired with the Wi-Fi Internet of Things controlled device;
storing an encryption key between the Wi-Fi Internet of Things master control device and the Wi-Fi Internet of Things controlled device, the MAC address of the Wi-Fi Internet of Things master control device, and the control information;
receiving the encrypted control information transmitted by the transmission unit of the Wi-Fi Internet of Things master control device;
transmitting confirmation information to the Wi-Fi Internet of Things master control device after the Wi-Fi Internet of Things controlled device receives the control information; and
decrypting the encrypted control information transmitted by the Wi-Fi Internet of Things master control device.

11. The Wi-Fi Internet of Things system according to claim 10, wherein the confirming step further comprises:
transmitting the confirmation information to the Wi-Fi Internet of Things master control device by loading a private information structure defined for confirmation into the unicast packet or multicast packet; or
transmitting the confirmation information to the Wi-Fi Internet of Things master control device in a manner of replying with an ACK data packet.

12. The Wi-Fi Internet of Things system according to claim 7, wherein the unicast packet or multicast packet is a unicast packet or multicast packet that does not need a media access control link.

13. The Wi-Fi Internet of Things system according to claim 12, wherein the unicast packet or multicast packet is a Beacon packet, a ProbResp packet, a ProbReq packet, or an Action packet.

14. The Wi-Fi Internet of Things system according to claim 12, wherein the unicast packet or multicast packet is a media access control link management packet or a data packet.

* * * * *